(12) United States Patent
Chang (10) Patent No.: US 9,619,054 B2
(45) Date of Patent: Apr. 11, 2017

(54) ACTIVE STYLUS WITH SWITCHING FUNCTIONS

(71) Applicant: eGalax_eMPIA Technology Inc., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 60 days.

(21) Appl. No.: 14/598,827

(22) Filed: Jan. 16, 2015

(65) Prior Publication Data

US 2015/0205383 A1   Jul. 23, 2015

Related U.S. Application Data

(60) Provisional application No. 61/928,881, filed on Jan. 17, 2014.

(51) Int. Cl.
*G06F 3/038* (2013.01)
*G06F 3/0354* (2013.01)
*G06F 3/041* (2006.01)

(52) U.S. Cl.
CPC ........ *G06F 3/0383* (2013.01); *G06F 3/03545* (2013.01); *G06F 3/041* (2013.01)

(58) Field of Classification Search
CPC ..... G06F 3/03545; G06F 3/0383; G06F 3/041
USPC .......................................... 345/173–174, 179
See application file for complete search history.

(56) References Cited

U.S. PATENT DOCUMENTS 6,326,956 B1* 12/2001 Jaeger .................. G06F 3/0317
178/19.05

| | | | | |
|---|---|---|---|---|
| 2006/0031786 A1* | 2/2006 | Hillis | .................. | G06F 3/04883 715/863 |
| 2006/0132456 A1* | 6/2006 | Anson | ................... | G06F 3/0488 345/173 |
| 2007/0205996 A1* | 9/2007 | Huang | ................ | G06F 3/03545 345/179 |
| 2008/0131189 A1* | 6/2008 | Yoon | ..................... | B43K 7/005 401/116 |
| 2008/0143693 A1* | 6/2008 | Schena | .................. | G01D 7/007 345/179 |
| 2009/0236153 A1* | 9/2009 | Kyung | ..................... | G06F 1/20 178/19.01 |
| 2011/0273376 A1* | 11/2011 | Dickinson | ........... | G06F 3/03545 345/173 |
| 2011/0285671 A1* | 11/2011 | Wu | ........................ | G06F 1/1626 345/179 |
| 2012/0086664 A1* | 4/2012 | Leto | ....................... | B43K 7/005 345/174 |
| 2013/0135220 A1* | 5/2013 | Alameh | .................. | G06F 3/041 345/173 |

(Continued)

*Primary Examiner* — Tony Davis
(74) *Attorney, Agent, or Firm* — Muncy, Geissler, Olds & Lowe, P.C.

(57) ABSTRACT

An active stylus includes a pen body defining an accommodation chamber and a through hole unit, a control device mounted in the accommodation chamber and including a circuit board capable of outputting a signal to a touch control device of a touch screen being touched by the active stylus and elastic conductive members electrically connected to the circuit board and exposed to the outside of the through hole unit, and a rotating barrel rotatably mounted on the pen body around the through hole unit and including control zones movable with the rotating barrel relative to the pen body to change the contact condition between the elastic conductive members and the pen body for causing the circuit board to output one of a series of control signals to the touch control device in executing a corresponding operating function.

7 Claims, 10 Drawing Sheets

(56) References Cited

U.S. PATENT DOCUMENTS

| | | | |
|---|---|---|---|
| 2013/0135262 A1* | 5/2013 | Alameh | G06F 3/0383 345/179 |
| 2013/0335380 A1* | 12/2013 | Griffin | G06F 3/03545 345/179 |
| 2014/0085269 A1* | 3/2014 | Armstrong-Muntner | G06F 3/03545 345/179 |
| 2014/0125606 A1* | 5/2014 | Namkung | G06F 1/1656 345/173 |
| 2014/0176495 A1* | 6/2014 | Vlasov | G06F 3/044 345/174 |
| 2014/0184505 A1* | 7/2014 | Fullerton | G06F 1/169 345/158 |
| 2014/0253461 A1* | 9/2014 | Hicks | G06F 1/3215 345/173 |
| 2014/0253468 A1* | 9/2014 | Havilio | G06F 3/03545 345/173 |
| 2014/0253522 A1* | 9/2014 | Cueto | G06F 3/03545 345/179 |
| 2014/0340318 A1* | 11/2014 | Stringer | G06F 3/03545 345/173 |
| 2014/0362024 A1* | 12/2014 | Hicks | G06F 3/167 345/174 |
| 2015/0009154 A1* | 1/2015 | Shih | G06F 3/04883 345/173 |
| 2015/0062070 A1* | 3/2015 | Fang | G06F 3/044 345/174 |
| 2015/0205390 A1* | 7/2015 | Yeh | G06F 3/0383 345/179 |
| 2015/0205391 A1* | 7/2015 | Chang | G06F 3/0383 345/173 |

* cited by examiner

ACTIVE STYLUS WITH SWITCHING FUNCTIONS

This reference is based on Provisional Application Ser. No. 61/928,881, filed on Jan. 17, 2014, currently pending.

BACKGROUND OF THE INVENTION

1. Field of the Invention

The present invention relates to a touch-sensing input device and more particularly, to an active stylus with switching functions, which allows shift of control zones to change the contact condition between elastic conductive members and a pen body upon rotating of a rotating barrel relative to the pen body, causing a circuit board to output one of a series of control signals to the touch control device of the touched touchscreen in executing a corresponding operating function.

2. Description of the Related Art

With fast development of modern technology, various advanced electronic products such as smart phone, touch-screen computers and TVs that have the characteristic of ease of use have been created and appeared on the market. Instead of the use of a keyboard or keypad in a computer or mobile phone for data input, a smart phone, tablet computer, touch screen computer or touch screen TV allows a user to operate it by touching or approaching a software icon on the surface of its touch screen directly with the finger or by means of a stylus without inputting complicated text instructions.

Conventional styluses commonly provide multiple function keys for switching by the user to initiate different functional operations, such as color change, clear, switching windows or screenshot, eliminating a complicated clicking procedure and saving much operating time.

However, in order to mate with different versatile designs of advanced electronic products, the number of stylus function keys must be relatively increased. When using a stylus, the user may inadvertently touch the function keys to initiate an undesired functional operation against the user's operation.

Therefore, it is desirable to provide a stylus with switching functions that eliminates the aforesaid problem.

SUMMARY OF THE INVENTION

The present invention has been accomplished under the circumstances in view. It is therefore the main object of the present invention to provide an active stylus with switching functions, which uses a rotating barrel to switch a control device instead of the use of function keys, preventing from inadvertently touching function keys and improving the convenience of the operation of the active stylus.

To achieve this and other objects of the present invention, an active stylus includes a pen body, a control device, and a rotating barrel. The pen body includes an accommodation chamber surrounded by an inner perimeter thereof, and a through hole unit located on an outer perimeter thereof. The control device is mounted in the accommodation chamber, including a circuit board capable of outputting a signal to a touch control device of a touch screen being touched by the active stylus, and at least one elastic conductive member electrically connected to the circuit board and exposed to the outside of the through hole unit. The rotating barrel is rotatably mounted on the pen body around the through hole unit, including at least one control zone movable with the rotating barrel relative to the pen body to change the contact condition between the at least one elastic conductive member and the pen body for causing the circuit board to output one of a series of control signals to the touch control device of the touch screen in executing a corresponding operating function.

DETAILED DESCRIPTION OF THE PREFERRED EMBODIMENT

Referring to FIGS. 1-6, an active stylus with a switching function in accordance with the present invention is shown. As illustrated, the active stylus includes a pen body 1, a control device 2, and a rotating barrel 3.

Figure 1:
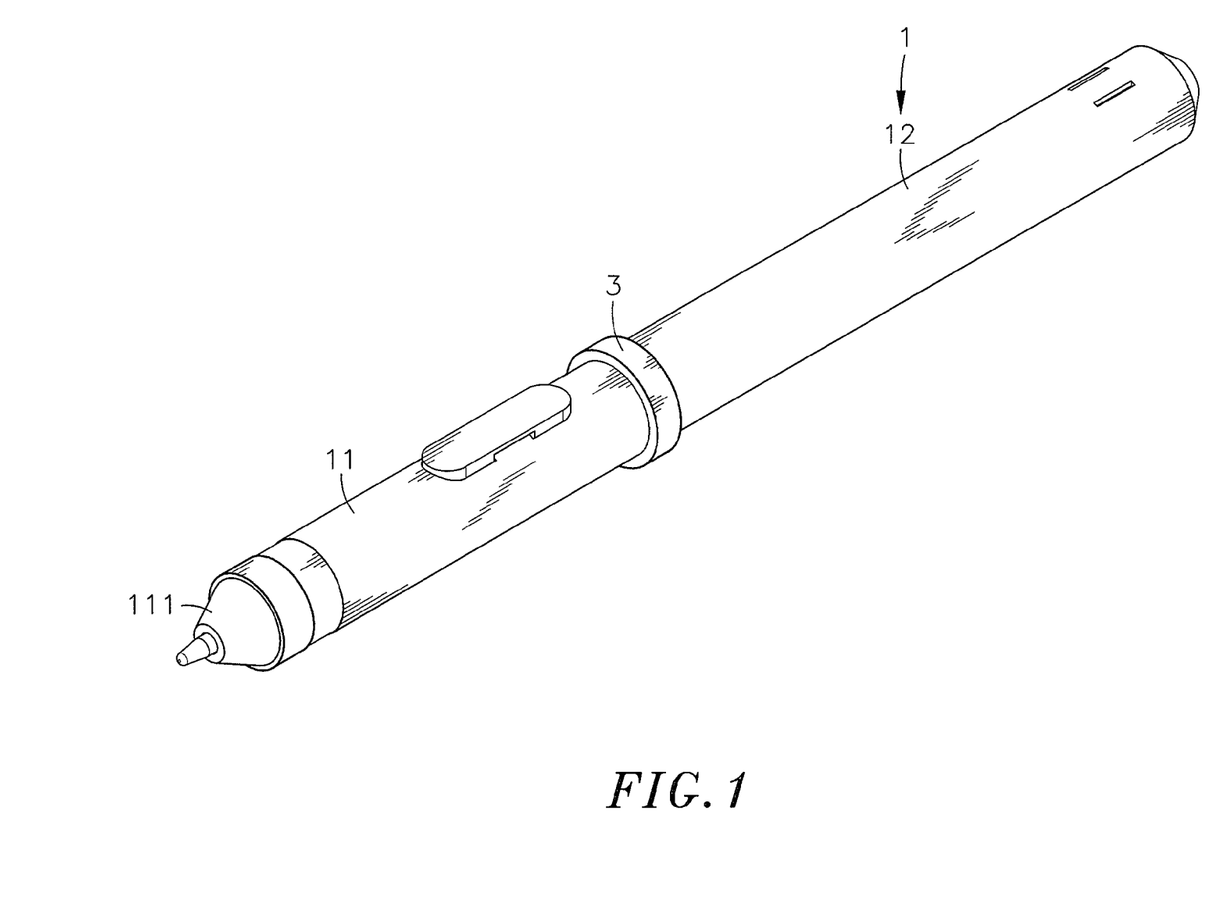
FIG. 1 is an oblique top elevational view of an active stylus in accordance with the present invention.
Figure 2:
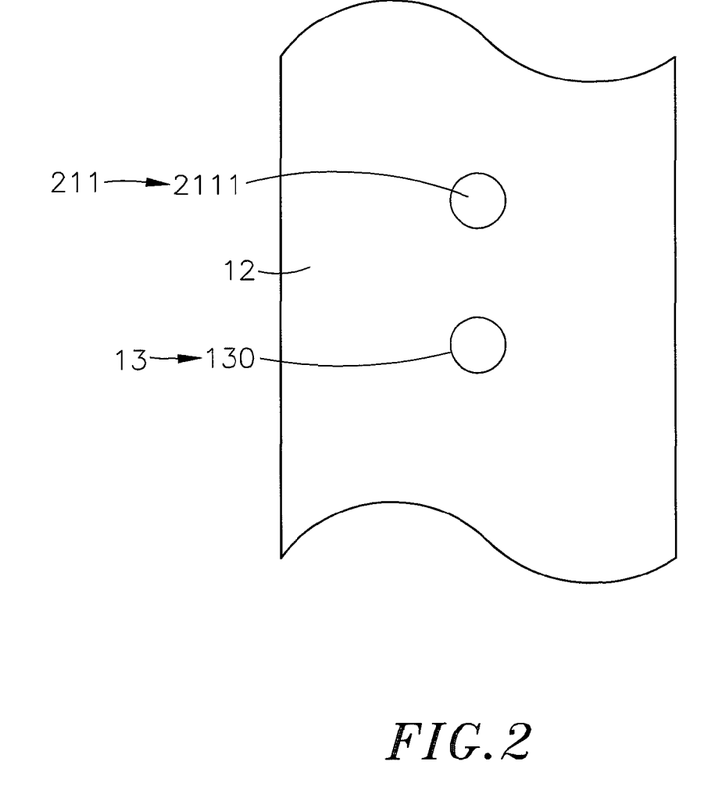
FIG. 2 is front view of a part of the pen body of the active stylus in accordance with the present invention.

As illustrated in FIGS. 1 and 2, the pen body 1 includes a lower pen holder 11 having a front touch head 111 at a front end thereof, an upper pen holder 12 made of a conductive material and located at an opposing top end of the lower pen holder 11, and an accommodation chamber 10 defined within the lower pen holder 11 and the upper pen holder 12. The upper pen holder 12 includes a through hole unit 13. The through hole unit 13 includes two longitudinally spaced through holes 130 disposed in communication with the accommodation chamber 10.

Figure 5:
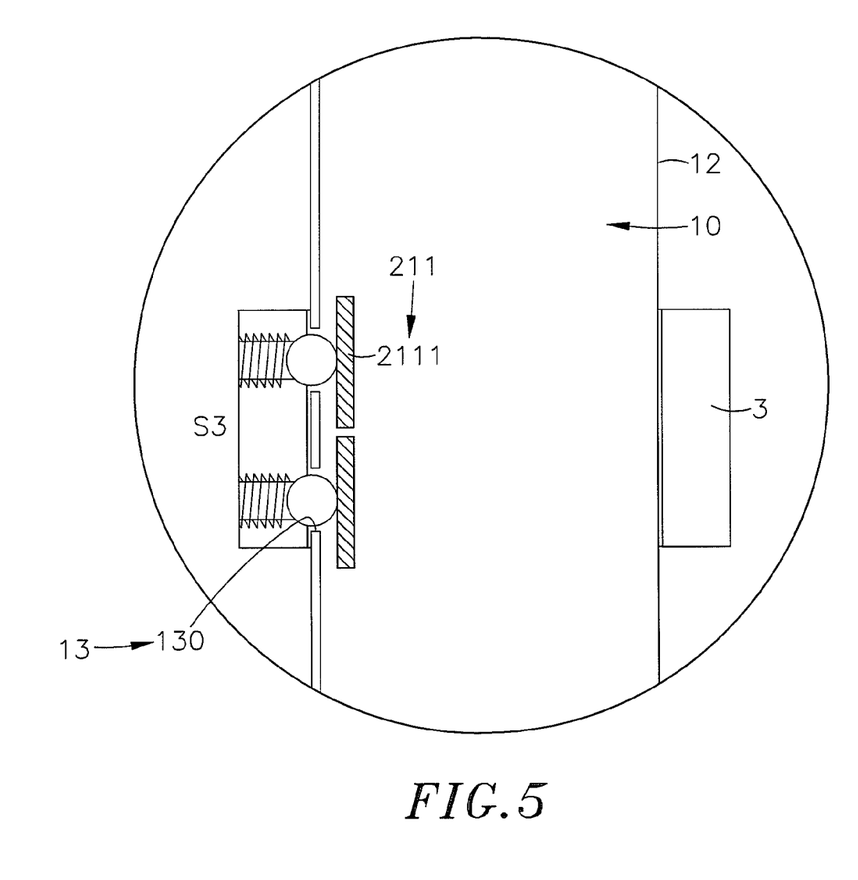
FIG. 5 is a sectional side view, in an enlarged scale, of the active stylus in accordance with the present invention.
Figure 6:
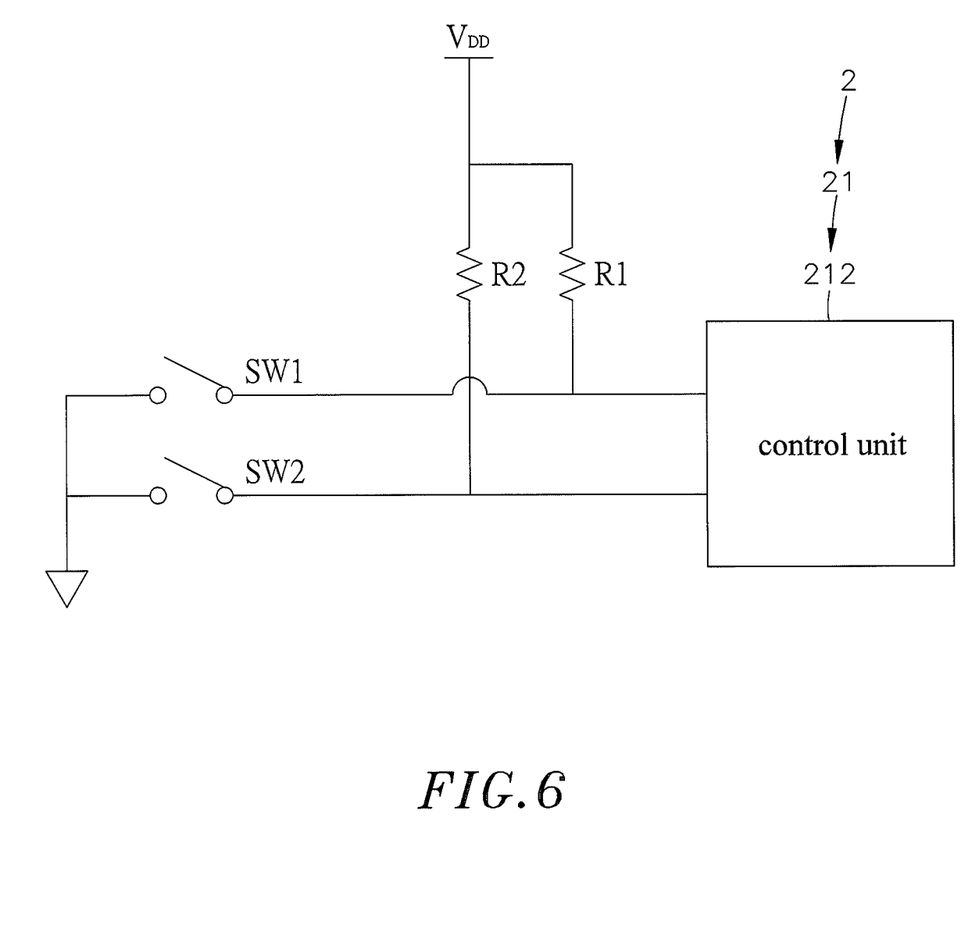
FIG. 6 is an equivalent circuit diagram of the circuit board of the active stylus in accordance with the present invention.
Figure 7:
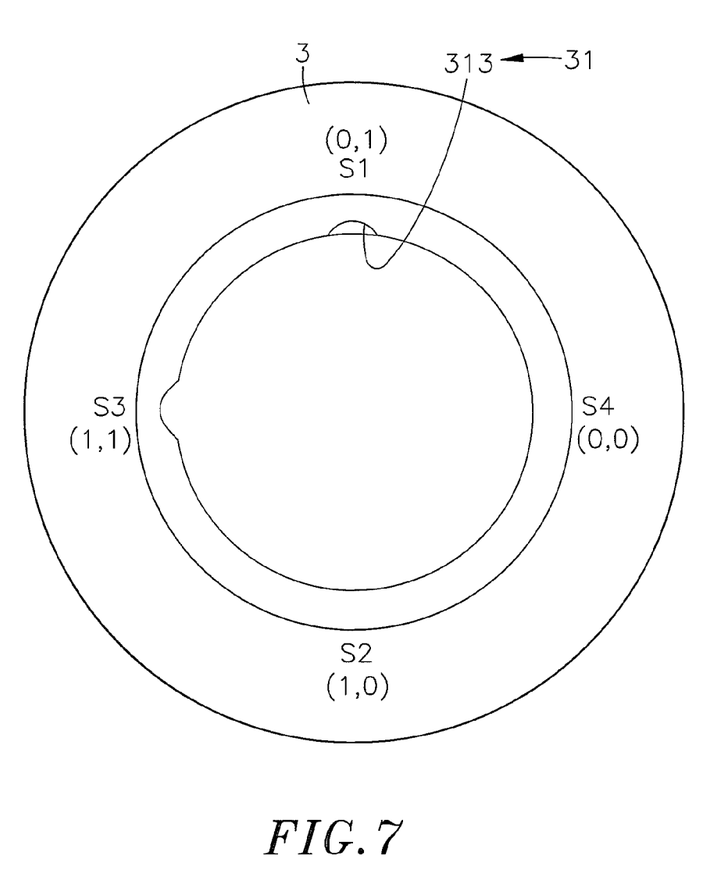
FIG. 7 is a sectional top view of an alternate form of the present invention.
Figure 8:
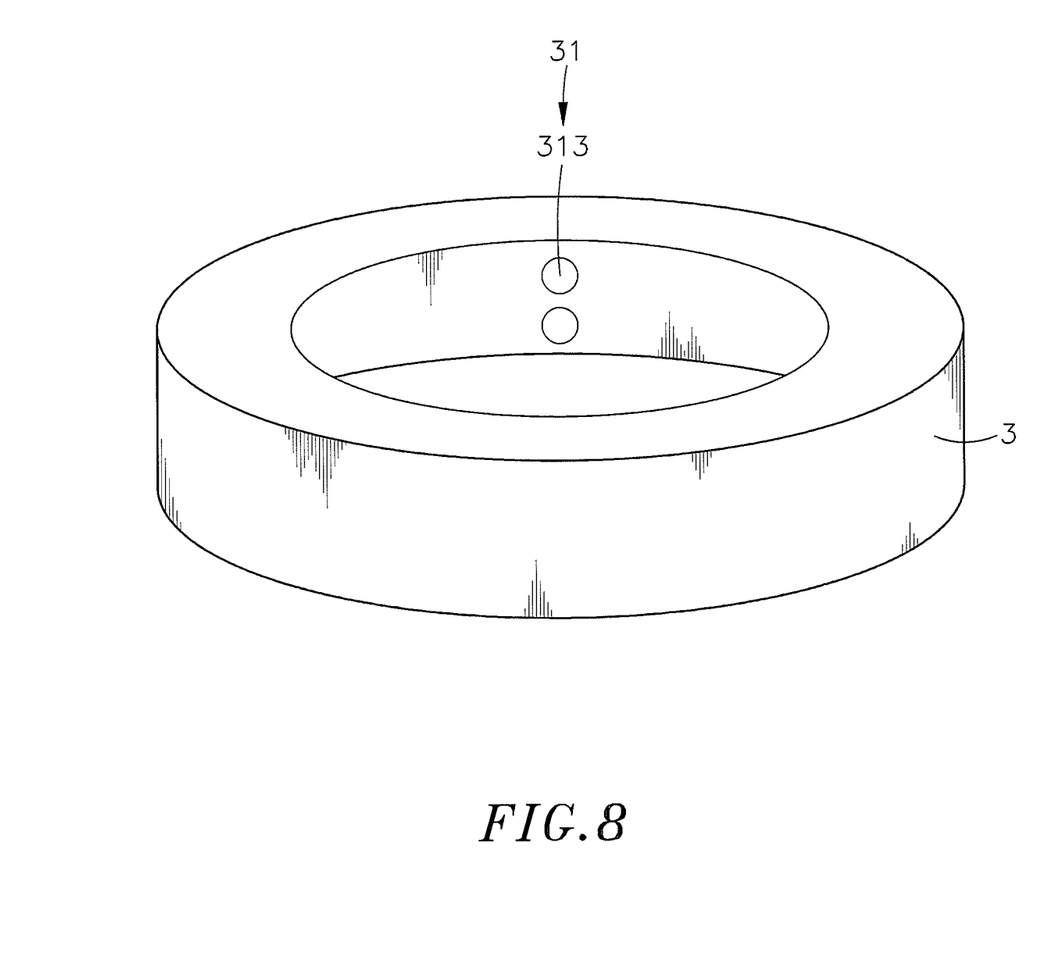
FIG. 8 is a schematic elevational view of an alternate form of the rotating barrel of the active stylus in accordance with the present invention.
Figure 9:
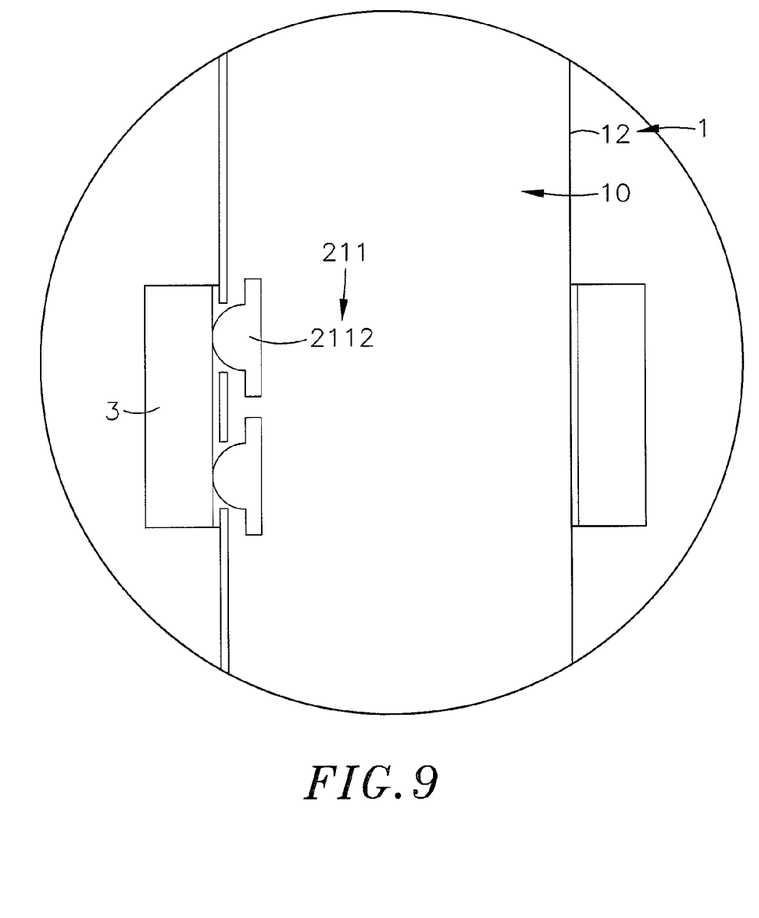
FIG. 9 is a schematic sectional side view illustrating an operation status of the alternate form of the active stylus in accordance with the present invention.
Figure 10:
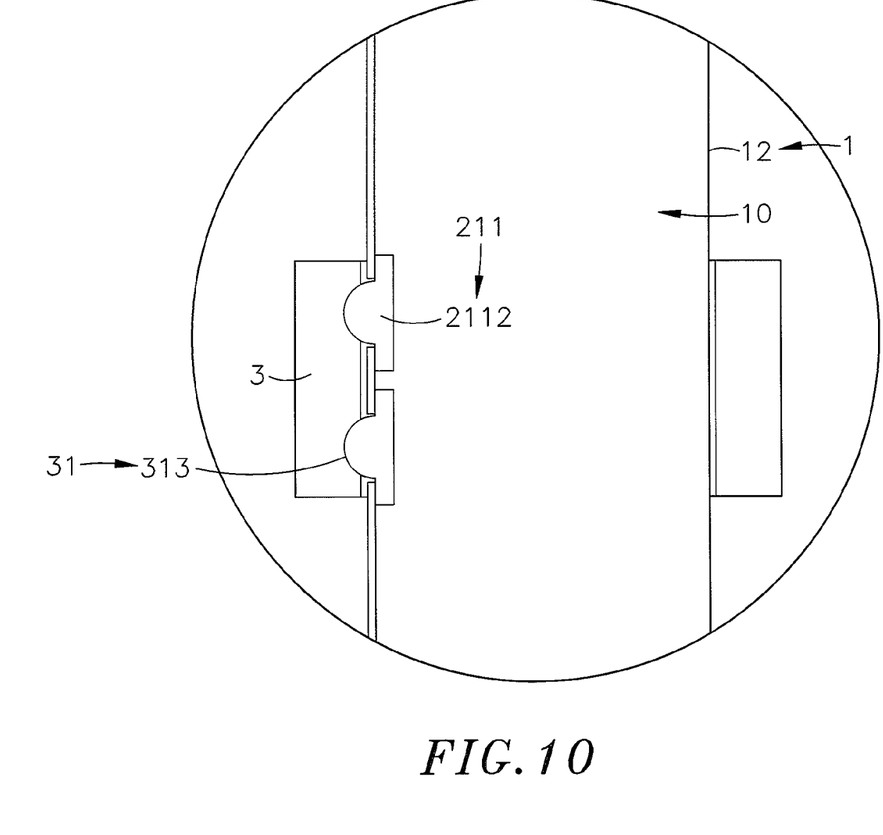
FIG. 10 is a schematic sectional side view illustrating another operation status of the alternate form of the active stylus in accordance with the present invention.

As illustrated in FIGS. 2, 5 and 6, the control device 2 includes a circuit board 21, and two elastic conductive members 211, for example, conductive shrapnels 2111 electrically connected to the circuit board 21 and spaced along the length of the pen body 1. As illustrated in FIG. 6, the circuit board 21 includes a voltage source $V_{DD}$, two resistors R1;R2 corresponding to the elastic conductive members 211, a control unit 212, and two switches, namely, the first switch SW1 and the second switch SW2. The voltage source $V_{DD}$ is electrically connected to respective one ends of the resistors R1;R2. The opposite ends of the resistors R1;R2 are respectively electrically connected to one end of the first switch SW1 and one end of the second switch SW2. The first switch SW1 and the second switch SW2 have the respective opposite ends thereof grounded.

Figure 3:
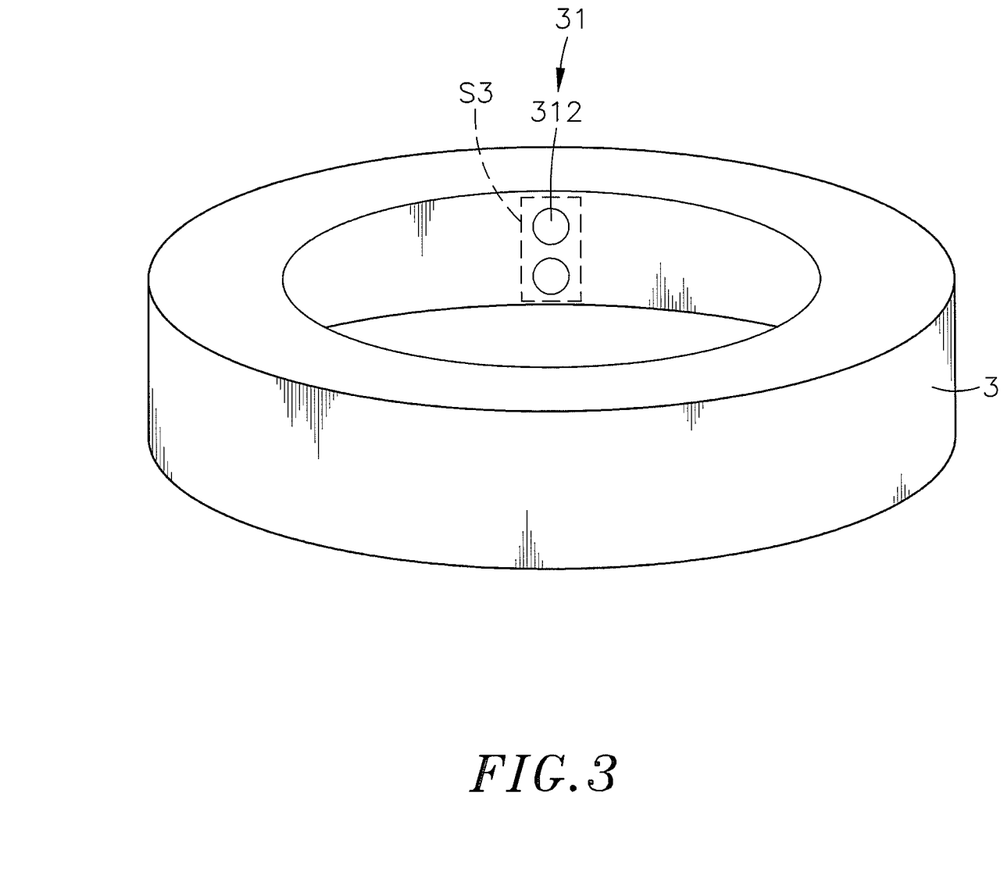
FIG. 3 is a schematic elevational view, in an enlarged scale, of the rotating barrel of the active stylus in accordance with the present invention.
Figure 4:
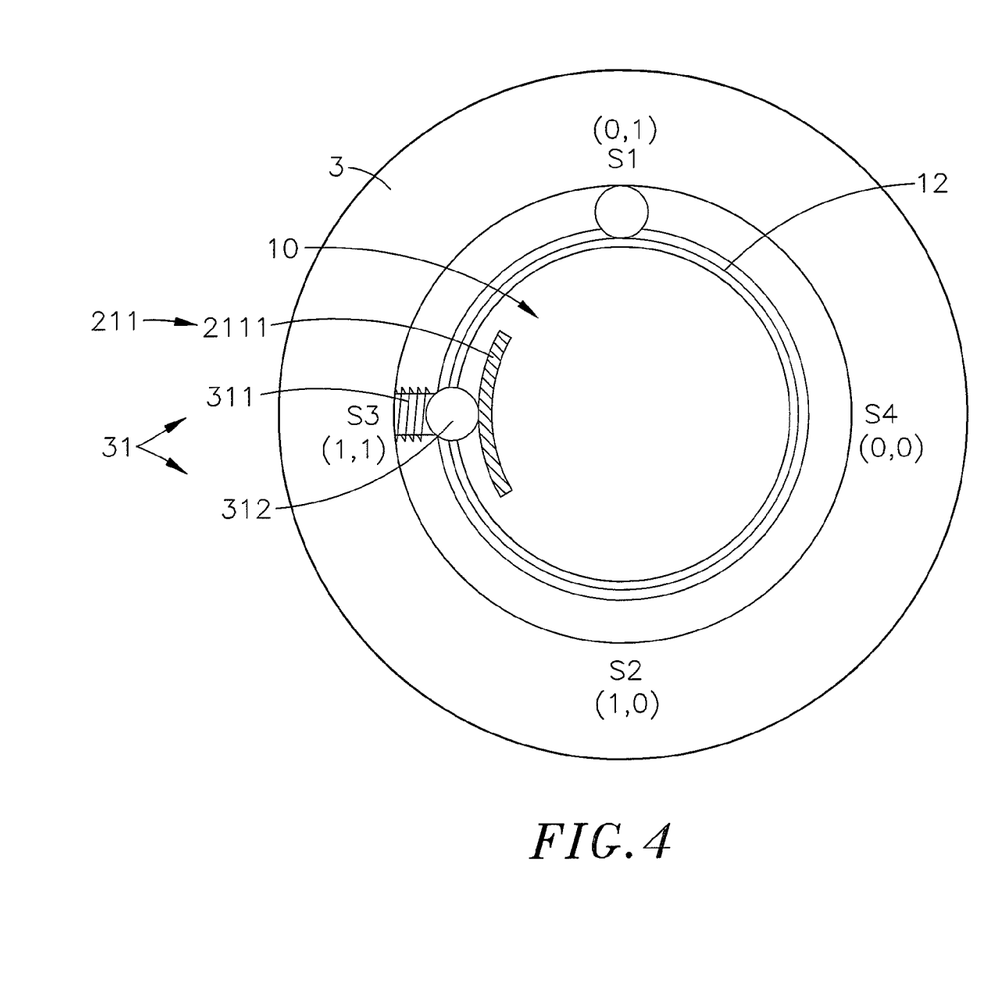
FIG. 4 is a sectional top view, in an enlarged scale, of the active stylus in accordance with the present invention.

Referring to FIGS. 3, 4 and 5, the rotating barrel 3 includes four control zones S1;S2;S3;S4 arranged the inner perimeter thereof. The first control zone S1 has a control button 31 mounted therein. The second control zone S2 has a control button 31 mounted therein. The third control zone S3 has two control buttons 31 mounted therein and spaced along the length of the pen body. The fourth control zone S4 has no any control button mounted therein. Each control button 31 includes a spring 311, and a pressure block 312 supported on the spring 311.

Referring to FIGS. 1-3 again, when assembling the active stylus, mount the circuit board 21 of the control device 2 in the accommodation chamber 10 to keep the shrapnels 2111 of the elastic conductive members 211 in abutment against the inside wall of the upper pen holder 12 over the respective through holes 130, and then attach the rotating barrel 3 to the outer perimeter of the pen body 1 to keep the four control zones S1;S2;S3;S4 around the through hole unit 13. Thus, the pen body 1, the control device 2 and the rotating barrel 3 are assembled to form the active stylus of the invention.

Referring to FIGS. 4-6 again, the first switch SW1 and the second switch SW2 respectively face toward one respective elastic conductive member 211. When the elastic conductive member 211 is abutted against a conductive material part of the inner perimeter of the upper pen holder 12, the respective switch SW1 or SW2 is electrically conducted (close circuit). On the contrary, when the elastic conductive member 211 is abutted against a non-conductive material part of the inner perimeter of the upper pen holder 12, the respective switch SW1 or SW2 is electrically disconducted (open circuit).

In the aforesaid description, the upper pen holder 12 of the pen body 1 has the through hole unit 13 defined therein, and the rotating barrel 3 is mounted around the upper pen holder 12. However, in actual application, the through hole unit 13 and the rotating barrel 3 can be defined in the lower pen body 11 or other location of the pen body 1 to mate with the two elastic conductive members 211.

The invention is applicable to a capacitive stylus. In application, the active stylus is attached to the touchscreen of the touch device, and then rotate the rotating barrel 3 relative to the pen body 1 to move the respective control buttons 31 in the control zones S1~S4 into abutment against or away from the respective elastic conductive members 211 to switch on/off the first switch SW1 and/or the second switch SW2, generating one of four signals (0,1), (1,0), (1,1) and (0,0) for causing the control unit 212 to output a corresponding control signal to the touch device in executing a respective function, such as color change, clear, switching windows, or screenshot.

Referring to FIGS. 7-10, in an alternate form of the present invention, each elastic conductive member 211 of the circuit board 21 includes a protruding block 2112 inserted into one respective through hole 130; a groove 313 is formed in the inner perimeter of the rotating barrel 3 to substitute each above-described control button 31. In application, the rotating barrel 3 can be rotated to directly press the inner perimeter thereof on the protruding blocks 2112 in switching off the switch SW1 and/or SW2, or to let the protruding blocks 2112 be received in the grooves 313 in switching on the switch SW1 and/or SW2.

It is to be noted that the design of two elastic conductive members 211 of the circuit board 21 of the control device 2 is simply an example but not intended for use to limit the scope of the present invention. In actual application, the circuit board 21 of the control device 2 can be configured to provide one single elastic conductive member 211 or more than two elastic conductive members 211, and the number of the control zones S can be relatively changed to match with the elastic conductive members 211 for producing different contact conditions between the elastic conductive members 211 and the pen body 1 to generating different signals.

Thus, by rotating the rotating barrel 3 relative to the pen body 1 to shift the control zones S1~S4 in changing the contact condition between the elastic conductive members 211 of the circuit board 21 and the pen body 1, different input signals can be inputted into the circuit board 21 for switching the operating functions of the touchscreen. This design eliminates the arrangement of function keys, preventing from inadvertently touching function keys and improving the convenience of the operation of the active stylus.

In conclusion, the active stylus of the present invention is characterized in that rotating the rotating barrel 3 relative to the pen body 1 to shift the control zones S1~S4 can change the contact condition between the elastic conductive members 211 of the circuit board 21 and the pen body 1 to input different input signals into the circuit board 21 for switching the operating functions of the touchscreen.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An active stylus, including:
   a pen body including an accommodation chamber surrounded by an inner perimeter thereof and a through hole unit located on an outer perimeter thereof;
   a control device mounted in the accommodation chamber, the control device including a circuit board capable of outputting a signal to a touch control device of a touch screen being touched by the active stylus, and at least one elastic conductive member electrically connected to the circuit board and exposed to the outside of the through hole unit; and
   a rotating barrel rotatably mounted on the pen body around the through hole unit, the rotating barrel including at least one control zone movable with the rotating barrel relative to the pen body to change the contact condition between the at least one elastic conductive member and the pen body for causing the circuit board to output one of a series of control signals to the touch control device of the touchscreen in executing a corresponding operating function.

2. The active stylus as claimed in claim 1, wherein the pen body includes a lower pen holder, the lower pen holder including a front touch head located at a front end thereof for touching the touch screen, an upper pen holder located at an opposing top end of the lower pen holder; the control device including the circuit board mounted inside the lower pen holder and the upper pen holder; each of at least one elastic conductive member is electrically connected to the circuit board; the rotating barrel is mounted around the upper pen holder.

3. The active stylus as claimed in claim 1, wherein the circuit board of the control device includes a voltage source, at least one resistor and at least one switch, each of the at least one resistor having one end thereof electrically connected to the voltage source and an opposite end thereof electrically connected to one end of one respective of the at least one switch and an opposite end thereof grounded, the at least one switch being selectively electrically conductible to the pen body by the at least one elastic conductive member.

4. The active stylus as claimed in claim 1, wherein each of the at least one elastic conductive member of the circuit board is a shrapnel; the at least one control zone of the rotating barrel each is selectively configured to provide at least one control button or to provide no control button, each of the at least one control button including a spring and a pressure block supported on the spring and insertable through the through hole unit to stop against one of the shrapnel.

5. The active stylus as claimed in claim 1, wherein each of the at least one elastic conductive member of the circuit board includes a protruding block extending out of the through hole unit; the at least one control zone of the rotating barrel each is selectively configured to provide at least one groove for receiving one respective the protruding block.

6. The active stylus as claimed in claim 3, wherein the through hole unit of the pen body includes at least one through hole respectively disposed corresponding to the at least one elastic conductive member; each of the switch is exposed to the outside of one respective the through hole.

7. The active stylus as claimed in claim 4, wherein the through hole unit of the pen body includes two through holes spaced along the length of the pen body; the circuit board of the control device including two elastic conductive members respectively exposed to the outside of the two through holes; the rotating barrel including four control zones numbered from first through fourth and spaced around the inner perimeter thereof, the first control zone having one of the control button mounted therein, the second control zone having one of the control button mounted therein, the third control zone having the two control buttons mounted therein and spaced along the length of the pen body, the fourth control zone being configured to provide no control button therein.

* * * * *